United States Patent
Beer

(10) Patent No.: US 8,210,067 B2
(45) Date of Patent: Jul. 3, 2012

(54) SHIFTING DEVICE FOR A MANUAL TRANSMISSION

(75) Inventor: Uwe Beer, Potsdam (DE)

(73) Assignee: ZF Friedrichshafen AG, Friedrichshafen (DE)

(*) Notice: Subject to any disclaimer, the term of this patent is extended or adjusted under 35 U.S.C. 154(b) by 327 days.

(21) Appl. No.: 12/569,046

(22) Filed: Sep. 29, 2009

(65) Prior Publication Data
US 2010/0101354 A1    Apr. 29, 2010

(30) Foreign Application Priority Data
Oct. 29, 2008  (DE) .......................... 10 2008 043 274

(51) Int. Cl.
*F16H 59/04* (2006.01)
*F16H 59/00* (2006.01)
*F16F 1/06* (2006.01)

(52) U.S. Cl. .................. 74/473.36; 74/335; 267/180

(58) Field of Classification Search .................. 74/335, 74/471 R, 473.1, 473.36, 473.37; 267/166, 267/179, 180
See application file for complete search history.

(56) References Cited

U.S. PATENT DOCUMENTS

| 5,094,121 | A | 3/1992 | von Kaler | |
| 5,743,147 | A * | 4/1998 | Gazyakan | 74/473.25 |
| 6,318,205 | B1 * | 11/2001 | Steinberger et al. | 74/473.37 |
| 6,318,206 | B1 | 11/2001 | Kramer et al. | |
| 6,691,590 | B1 * | 2/2004 | Patzner et al. | 74/473.24 |
| 7,788,989 | B2 * | 9/2010 | Keller et al. | 74/473.36 |
| 2005/0199084 | A1 | 9/2005 | Beer et al. | |
| 2008/0216595 | A1 * | 9/2008 | Horing | 74/473.37 |

FOREIGN PATENT DOCUMENTS

| DE | 854 156 | 6/1950 |
| DE | 199 19 270 A1 | 11/2000 |
| DE | 102 24 308 A1 | 12/2003 |
| DE | 10 2005 034 283 A1 | 2/2007 |
| EP | 1 734 290 A2 | 12/2006 |
| JP | 10-267 122 A | 10/1998 |
| WO | 03/064896 A1 | 8/2003 |

* cited by examiner

*Primary Examiner* — Justin Krause
*Assistant Examiner* — Adam D Rogers
(74) *Attorney, Agent, or Firm* — Davis & Bujold, P.L.L.C.

(57) ABSTRACT

A shifting device for a manual transmission having a shift rocker formed by two rocker arms connected by a rocker bridge, which is arranged over a shift sleeve via two slide-blocks attached to a holder at the end of each rocker arm, which pivots about a transverse axis defined by bearing points. A carrier element is positioned off-center on the rocker bridge to engage with a shifting pin of a shifting shaft. The rocker arm closer to the carrier element has a lower elastic rigidity than the other rocker arm. To produce different spring rigidities, the rocker arm closer to the carrier element has the geometrical form of a spring element which is elastic in the pivoting direction. The, rocker arm farther away from the carrier element is a bracket with relatively greater elastic rigidity.

6 Claims, 3 Drawing Sheets

SHIFTING DEVICE FOR A MANUAL TRANSMISSION

This application claims priority from German patent application serial no. 10 2008 043 274.1 filed Oct. 29, 2008.

FIELD OF THE INVENTION

The invention concerns a shifting device for a manual transmission, with at least one shift rocker which has a basic U-shape formed by two rocker arms connected to one another by a rocker bridge, which is arranged over a shifting packet of a transmission shaft comprising a shift sleeve, which is engaged with an annular groove of the shift sleeve by virtue of two slide-blocks respectively attached at the ends to a holder on each rocker arm, which is mounted to pivot about a transverse axis determined by two bearing points respectively arranged one on each rocker arm, and which comprises a carrier element arranged off-center on the rocker bridge in order to engage with a shifting pin of a shifting shaft arranged axis-parallel in relation to the transmission shaft, and such that the rocker arm closer to the carrier element has a lower elastic rigidity than the rocker arm farther away from the carrier element.

BACKGROUND OF THE INVENTION

A change-speed transmission that can be shifted manually by means of a hand-operated shift lever or automatically by means of at least one auxiliary-force-actuated gear control element usually comprises a plurality of gearsets with different transmission ratios, which are arranged between two axis-parallel transmission shafts and in each case have a fixed wheel attached in a rotationally fixed manner on one of the transmission shafts and a loose wheel mounted to rotate on the other transmission shaft. To engage a gear, the loose wheel of the gearset concerned is connected rotationally fixed to the transmission shaft concerned by engaging an associated gear clutch. The gear clutches can be unsynchronized, i.e. in the form of so-termed claw clutches, or friction-synchronized, i.e. as so-termed synchronous clutches. The gear clutches are usually combined in pairs in a common shifting packet, in each case with a shift sleeve arranged in a rotationally fixed manner but able to move axially on the transmission shaft concerned. Consequently, the engagement and disengagement of the gears associated with a shifting packet takes place by axial displacement of the shift sleeve in respectively opposite directions.

The transmission-internal portion of the shifting device for actuating the shift sleeve can comprise several shift rods, which are arranged axis-parallel to the transmission shafts and are mounted to move axially within the transmission housing, and to which in each case is solidly attached a shift rocker which engages with an associated shift sleeve. To engage a gear, the shift rod concerned is mechanically coupled in a selection process using the manual shift lever or gear control element, and is displaced axially in the subsequent shifting process. The disadvantages of a shifting device of this type, however, are the relatively large structural space they occupy for the arrangement and mounting of the shift rods, and the comparatively large shifting forces needed to engage and disengage the gears.

In another form of the shifting device which takes up less space and requires lower shifting forces, the transmission-internal portion comprises a plurality of shift rockers each having a basic U-shape and consisting of two rocker arms connected to one another by a rocker bridge, which are arranged over a shifting packet of a transmission shaft that comprises a shift sleeve, which engage with an annular groove of the shift sleeve concerned by means of two slide-blocks respectively attached at the end of each rocker arm on a holder, which are mounted to pivot about a transverse axis determined by two bearing points located respectively on each of the rocker arms, and which have a carrier element arranged on the V bridge to engage with a shifting pin of a shifting shaft arranged axis-parallel to the transmission shaft. The shifting shaft is mounted to rotate and move axially within the transmission housing and comprises a plurality of shifting pins. In a selection process the shifting shaft is rotated about its longitudinal axis and is coupled to a shift rocker when one of the shifting pins engages with the carrier element of the rocker, and in the subsequent shifting process it is displaced axially whereby the shift rocker is pivoted about its transverse axis.

For the selection process, i.e. for coupling the shifting shaft in each case to one of several shift rockers, in order to ensure a sufficient angular resolution and a secure engagement of the shifting pin in the respective carrier element over the entire travel path for the shifting operation, the shifting shaft is usually arranged centrally above the shift rockers but the carrier elements are correspondingly fixed off-center on the rocker bridges of the shift rockers. However, this has the disadvantage that the shifting force is applied asymmetrically to the shift rocker and the shifting force is transferred unequally, via the rocker arms of the shift rockers, to the respective shift sleeve.

Since with the usual, symmetrical design of the shift rocker arms the shorter part of the shift rocker formed by the rocker arm closer to the carrier element and the adjacent, shorter section of the rocker bridge has less spring elasticity because of its smaller overall length that the longer part of the shift rocker formed by the rocker arm farther away from the carrier element and the adjacent, longer section of the rocker bridge, the shifting force is transferred to the shift sleeve for the most part by the more rigid, shorter part of the shift rocker and correspondingly on one side of the sleeve. Besides this unfavorable force transfer, the intensive contact of the shift sleeve with the more rigid, shorter part of the shift rocker also favors an undesired transmission of oscillations and vibrations from the transmission to the manual shift lever or gear control element of the shifting device.

A typical shift rocker with a symmetrical rocker arm design is described for example in DE 199 19 270 A1. The rocker bridge and the two rocker arms of this known shift rocker are made as an integral pressed and stamped sheet component. The rocker arms are made as simple brackets and are each provided at the end with a fitting bore for the attachment of a slide-block and, approximately centrally, with a bearing bore for the engagement of a bearing bolt of a pivot bearing. On the rocker bridge a rail that projects on one side is fixed by means of a substantially central weld, and on this rail among other things a fork-shaped carrier element for engaging a shifting pin of a shifting shaft is attached off-center. The central welding of the rail to the rocker bridge is designed to ensure symmetrical application. However, owing to the effective lever arm between the carrier element and the rail weld, there is a tilting torque which results in asymmetrical distribution and transfer of a shifting force in or via the two rocker arms.

Another embodiment of a shift rocker with symmetrically designed rocker arms is known from DE 10 2005 034 283 A1. The shift rocker illustrated in FIG. 4 of that document and explained in the associated description comprises a carrier element arranged off-center for engaging a shifting pin of a shifting shaft. The rocker arms are made identically to one another and have at the end in each case a U-shaped curve extending in the pivoting direction, at the curve bottoms of which are respective fitting bores for the attachment of a slide-block and at the free ends of which there is in each case a bearing aperture for engaging a bearing bolt. Due to their curved ends the rocker arms have lower elastic rigidity compared with rocker arms made as brackets, whereby the transfer of oscillations and vibrations from the transmission to other parts of the shifting device can be damped. However, the asymmetrical distribution and transfer of a shifting force from the carrier element in or via the two rocker arms is still a disadvantage.

To avoid that disadvantage a shift rocker is proposed in EP 1 472 478 B1 (DE 603 01 489 T2), in which the rocker arm closer to the carrier element arranged off-center has a lower elastic rigidity than the other rocker arm farther away from the carrier element. Owing to this lower elastic rigidity of the rocker arm nearer the carrier element, achieved by making it with a smaller cross-sectional area, during the transfer of a shifting force it yields elastically to the extent that a substantial fraction of the shifting force is also transferred by the other rocker arm. In the example embodiment described, the rocker arms are made largely identically and have at their end in each case a U-shaped curve extending in the pivoting direction, with an inner leg attached to the rocker bridge and an outer leg connected to this via a curve bottom. At the free end of the outer leg there is in each case a fitting bore for fixing a slide-block. A bearing bore for engaging a bearing bolt of a pivot bearing is provided at the bottom of the curve or in the middle of the inner leg. The smaller cross-sectional area intended to reduce the elastic rigidity of the rocker arm closer to the carrier element is in this case produced by reducing the material thickness of the inner leg concerned. But since the elasticity of both rocker arms is determined essentially by the considerably smaller material thickness of the outer leg, the efficacy of this known design is questionable. Besides, reducing the cross-section of one of the rocker arms can reduce the fatigue strength of the shift rocker.

SUMMARY OF THE INVENTION

Against this background the purpose of the present invention is to propose a shift rocker of a shifting device of a manual transmission with a carrier element arranged off-center, in which, to achieve substantially symmetrical force distribution and force transfer, the spring rigidity of the rocker arm closer to the carrier element is reduced compared to the spring rigidity of the rocker arm farther away from the carrier element in a manner more favorable from the standpoint of loading.

This objective is achieved in that to produce the different spring rigidities, the two rocker arms of the shift rocker have different geometrical forms.

Accordingly, the invention starts with a shift rocker of the shifting device of a manual transmission, which is basically U-shaped and is formed of two rocker arms connected to one another by a rocker bridge. In a manner known per se the shift rocker is arranged over a shifting packet that comprises a shift sleeve, it engages with an annular groove of the shift sleeve via two slide-blocks fixed to holders at the respective ends of each rocker arm, and it is mounted to pivot about a transverse axis determined by two bearing points arranged respectively one on each rocker arm. A carrier element for engaging a shifting pin of a shifting shaft arranged axis-parallel in relation to the transmission shaft is fixed off-center on the rocker bridge.

In order to achieve a largely uniform load distribution within the shift rocker and a substantially symmetrical force transfer to the associated shift sleeve despite the off-center arrangement of the carrier element and the resulting lateral application of a shifting force via the associated shifting pin of the shifting shaft, the rocker arm closer to the carrier element has a lower spring rigidity than the rocker arm farther away from the carrier element. In contrast to known shift rockers such as the one described in EP 1 472 478 B1, however, according to the present invention this is achieved in that the two rocker arms of the shift rocker have different geometrical forms.

By virtue of a special geometrical form differing from that of the rocker farther away from the carrier element, the rocker arm closer to the carrier element can in a simple manner be made to have greater spring elasticity without it being necessary, for this, to reduce a cross-section of the rocker arm and thereby risk compromising the fatigue strength of the shift rocker. The spring rigidity of the rocker arm closer to the carrier element is achieved by giving it an appropriate shape, essentially by increasing the effective length of the rocker arm in proportion to its cross-section, and this can be designed according to need. In addition, thanks to the resulting increase of the spring elasticity of the shift rocker as a whole, the transfer of oscillations and vibrations from the transmission to other parts of the shifting device is effectively damped, so the damping elements sometimes provided in shifting devices for that purpose can be omitted.

To produce the different spring rigidities of the two rocker arms it is particularly advantageous for the rocker arm closer to the carrier element, preferably in its section between the bearing point and the slide-block holder, to have the shape of a spring element with elasticity in the pivoting direction, whereas in contrast the rocker arm farther away from the carrier element is made in the usual manner as a bracket with relatively higher spring rigidity.

The section of the rocker arm closer to the carrier element that is made as a spring element is preferably formed as a spiral spring lying in the plane of the pivoting direction, with a wider outer spiral curve and a narrower inner spiral curve.

To produce the extension of the force transfer path that is important for reducing the spring rigidity of the rocker arm, it is expediently provided that the outer spiral curve of the spiral spring extends from the bearing point as far as under the slide-block holder, and the inner spiral curve of the spiral spring extends from there to the slide-block holder.

The shift rocker according to the invention, with its rocker bridge, the two rocker arms and the carrier element, can be produced simply and inexpensively as an integrated aluminum pressure-diecast component. It is also possible, however, to produce the shift rocker according to the invention as a pressed and stamped sheet component, in which the plurality of individual parts are welded together where necessary or connected permanently to one another in some other way.

BRIEF DESCRIPTION OF THE DRAWINGS

To clarify the invention, the description of a drawing showing an example embodiment is attached. The drawings show.

DETAILED DESCRIPTION OF THE PREFERRED EMBODIMENTS

Figure 1:
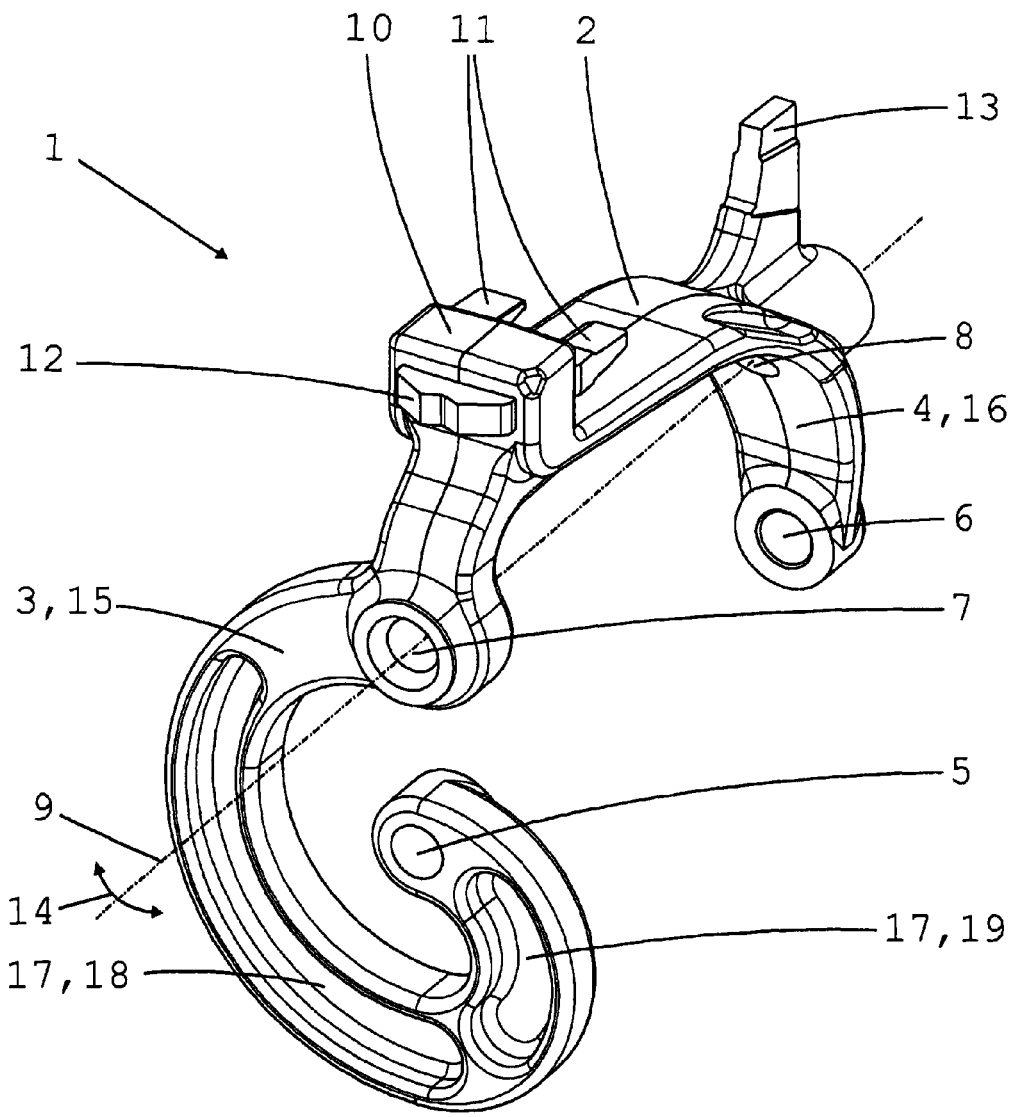
FIG. 1: A design of a shift rocker according to the invention, as seen in a first perspective view.
Figure 2:
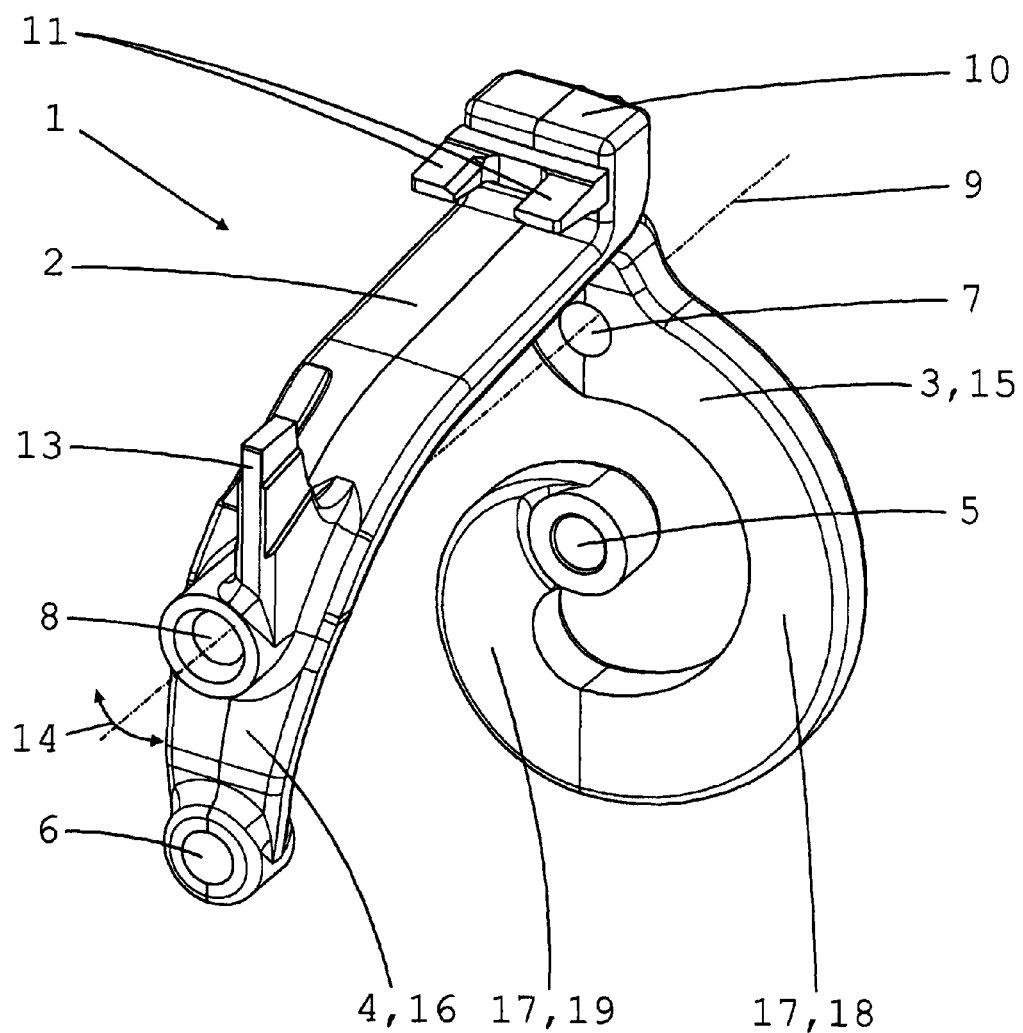
FIG. 2: The shift rocker of FIG. 1, seen in a second perspective view.
Figure 3:
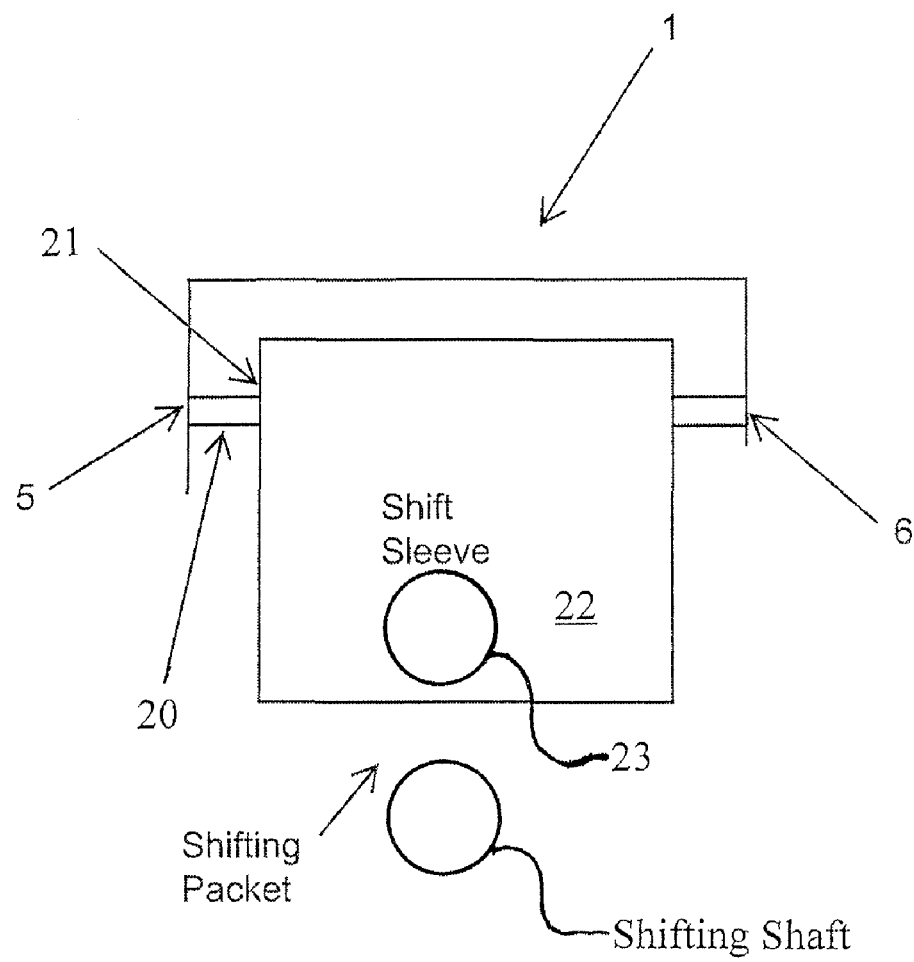
FIG. 3: A diagrammatic view of the shift rocker of FIG. 1.

The shift rocker 1 illustrated in different perspective views in FIGS. 1 and 2 has a basic U-shape and consists of two rocker arms 3, 4 connected to one another by a rocker bridge 2. Each rocker arm 3, 4 is provided at its end with a holding bore 5, 6 for the attachment of a respective slide-block 20, the latter being provided in order to engage in an outer annular groove 21 of an associated shift sleeve 22. Two bearing bores 7 and 8 arranged respectively in each rocker arm 3; 4, into which bearing bolts which can be fixed to the housing can be inserted, determine a transverse axis 9 about which the shift rocker 1 is mounted to pivot when in the assembled condition. On the rocker bridge 2 in an off-center position is arranged a supporting block 10 which supports an inward-directed, fork-shaped carrier element 11 for engaging a shifting pin of a transmission shaft 23, and an outward-directed detent element 12 with a detent recess for engaging a detent element fixed on the housing. Opposite the supporting block 10 and off-center on the rocker bridge 2 is attached a locking lever 13 for locking the shift rocker 1 if necessary.

To achieve a uniform distribution and a largely symmetrical transfer of a shifting force applied by the carrier element 11 via the rocker arms 3, 4 of the shift rocker 1, the rocker arm 3 closer to the carrier element 11 has a lower spring rigidity than the rocker arm 4 farther away from the carrier element 11. In this case the different spring rigidities of the two rocker arms 3, 4 are produced by virtue of the different geometrical forms or shapes of the rocker arms 3, 4. For this, particularly in its section between the bearing bore 7 and the holder bore 5 the rocker arm 3 closer to the carrier element 11 is in the form of a spring element 15 with elasticity in the pivoting direction 14, whereas the rocker arm 4 farther away from the carrier element 11 is formed as a bracket 16 with relatively greater spring rigidity.

The section of the rocker arm 3 closer to the carrier element 11 that constitutes a spring element 15 is in the form of a spiral spring 17 lying in the plane of the pivoting direction 14, with a wider, radially outer spiral curve 18 and a narrower, radially inner spiral curve 19, such that to produce the desired elasticity the outer curve 18 of the spiral spring 17 extends as far as under the holder bore 5, while the inner spiral curve 19 of the spiral spring 17 extends from there to the holder bore 5.

Thanks to the different geometrical form of the two rocker arms 3, 4 as described, the spring rigidity of the rocker arm 3 closer to the carrier element 11 is reduced to the extent that during a force transfer it yields elastically, so that a shifting force applied by the off-center carrier element 11 into the shift rocker 1 is distributed substantially uniformly on both rocker arms 3, 4 and is correspondingly transferred symmetrically to the associated shift sleeve. The shift rocker 1, which consists essentially of the rocker bridge 2 and the two rocker arms 3, 4, can be produced together with the supporting block 10, the carrier element 11, the detent element 12 and the locking level 13, in an inexpensive manner as an integral aluminum pressure-diecast component.

INDEXES

1 Shift rocker
2 Rocker bridge
3 Rocker arm
4 Rocker arm
5 Holder bore, slide-block holder
6 Holder bore, slide-block holder
7 Bearing bore, bearing point
8 Bearing bore, bearing point
9 Transverse axis
10 Supporting block
11 Carrier element
12 Detent element
13 Locking lever
14 Pivoting direction
15 Spring element
16 Bracket
17 Spiral spring
18 Outer spiral curve
19 Inner spiral curve
20 Slide-block
21 Outer Annular Groove
22 Shift Sleeve
23 Transmission Shaft

The invention claimed is:

1. A shifting device for a manual transmission, the shifting device comprising:
   at least one shift rocker (1) having a U-shape and being formed by first and second rocker arms (3, 4) connected to one another by a rocker bridge (2);
   the at least one shift rocker (1) being arranged over a shifting packet of a transmission shaft, the shifting packet comprising a shift sleeve engaging with an annular groove of the shift sleeve via first and second slide-blocks;
   first and second bearing points (7, 8) each respectively arranged on one of the first and second rocker arms (3, 4) and together defining a transverse axis (9);
   the first and the second slide-blocks each being attached to a respective holder (5, 6) of the first and second rocker arms (3, 4) so as to be mounted to pivot about the transverse axis (9);
   the at least one shift rocker (1) comprising a carrier element (11), located off-center on the rocker bridge (2), for engaging with a shifting shaft arranged parallel to the transmission shaft;
   the first and the second rocker arms (3, 4) of the at least one shift rocker (1) being shaped differently from one another, and the first rocker arm (3), which is closer to the carrier element (11), having a lower spring rigidity than the second rocker arm (4) located farther away from the carrier element (11) so as to produce different spring rigidities;
   a section of the first rocker arm (3), between the first bearing point (7) and the respective slide-block holder (5), being a spring element (15) which is elastic in a pivoting direction (14), while the second rocker arm (4), located farther away from the carrier element (11), being a bracket (16) with relatively greater spring rigidity; and
   the spring element (15) being configured as a spiral spring (17) having a wider outer spiral curve (18) and a narrower inner spiral curve (19) and lying in a plane of the pivoting direction (14).

2. The shifting device according to claim 1, wherein the at least one shift rocker (1) is manufactured as an integral aluminum pressure-diecast component.

3. The shifting device according to claim 2, wherein the at least one shift rocker (1) is manufactured as an integral aluminum pressure-diecast component.

4. A shifting device for a manual transmission, the shifting device comprising:
   at least one shift rocker (1) having a U-shape and being formed by first and second rocker arms (3, 4) connected to one another by a rocker bridge (2);
   the at least one shift rocker (1) being arranged over a shifting packet of a transmission shaft, the shifting packet comprising a shift sleeve engaging with an annular groove of the shift sleeve via first and second slide-blocks;

first and second bearing points (7, 8) each respectively arranged on one of the first and second rocker arms (3, 4) and together defining a transverse axis (9);

the first and the second slide-blocks each being attached to a respective holder (5, 6) of the first and second rocker arms (3, 4) so as to be mounted to pivot about the transverse axis (9);

the at least one shift rocker (1) comprising a carrier element (11), located off-center on the rocker bridge (2), for engaging with a shifting shaft arranged parallel to the transmission shaft;

the first and the second rocker arms (3, 4) of the at least one shift rocker (1) being shaped differently from one another, and the first rocker arm (3), which is closer to the carrier element (11), having a lower spring rigidity than the second rocker arm (4) located farther away from the carrier element (11) so as to produce different spring rigidities;

a section of the first rocker arm (3), between the first bearing point (7) and the respective slide-block holder (5), being a spring element (15) which is elastic in a pivoting direction (14), while the second rocker arm (4), located farther away from the carrier element (11), being a bracket (16) with relatively greater spring rigidity; and the first rocker arm (3) closer to the carrier element (11), formed as a spring element (15), being configured as a spiral spring (17) which has a wider outer spiral curve (18) and a narrower inner spiral curve (19) and lying a plane of the pivoting direction (14); and the outer spiral curve (18) of the spiral spring (17) extending from the first bearing point (7) to a location substantially vertically under the respective holder (5) while the inner spiral curve (19) of the spiral spring (17) extending from the location substantially vertically under the respective (5) to the respective holder (5).

5. A shifting device for a manual transmission, the shifting device comprising:

at least one shift rocker (1) having a U-shape and being formed by first and second rocker arms (3, 4) connected to one another by a rocker bridge (2);

the at least one shift rocker (1) being arranged over a shifting packet of a transmission shaft, the shifting packet comprising a shift sleeve engaging with first and second slide-blocks, first and second bearing points (7, 8) each respectively arranged on one of the first and second rocker arms (3, 4) and together defining a transverse axis (9);

the first and the second two slide-blocks each being attached to a respective holder (5, 6) of the first and the second rocker arms (3, 4) for pivoting about the transverse axis (9);

the at least one shift rocker (1) comprising a carrier element (11), located off-center on the rocker bridge (2), for engaging with a shifting shaft arranged parallel to the transmission shaft;

the first and the second rocker arms (3, 4) of the at least one shift rocker (1) being shaped differently from one another, and the first rocker arm (3), which is closer to the carrier element (11), having a lower spring rigidity than the second rocker arm (4) located farther away from the carrier element (11) so as to produce different spring rigidities;

a section of the first rocker arm (3), between the first bearing point (7) and the slide-block holder (5), being an elastic spring element (15) while the second rocker arm (4), located farther away from the carrier element (11), being a bracket (16) having greater rigidity; and the section of the first rocker arm (3) having a wider outer spiral curve (18) and a narrower inner spiral curve (19) and lying in a plane of the pivoting direction (14).

6. The shifting device according to claim 5, wherein the at least one shift rocker (1) is manufactured as an integral aluminum pressure-diecast component.

* * * * *